(12) United States Patent
Tesei et al.

(10) Patent No.: US 12,536,214 B2
(45) Date of Patent: Jan. 27, 2026

(54) COMPUTER-IMPLEMENTED METHOD AND SYSTEM FOR MANAGING AND UPDATING REGULATORY DIGITAL TEXTUAL DOCUMENTS

(71) Applicant: Aptus.Ai S.R.L., Pisa (IT)

(72) Inventors: Andrea Tesei, Latina (IT); Lorenzo De Mattei, Pisa (IT)

(73) Assignee: APTUS.AI S.R.L., Pisa (IT)

( * ) Notice: Subject to any disclaimer, the term of this patent is extended or adjusted under 35 U.S.C. 154(b) by 0 days.

(21) Appl. No.: 18/355,022

(22) Filed: Jul. 19, 2023

(65) Prior Publication Data

US 2025/0028749 A1    Jan. 23, 2025

(51) Int. Cl.
| | |
|---|---|
| *G06F 16/338* | (2019.01) |
| *G06F 16/31* | (2019.01) |
| *G06V 10/82* | (2022.01) |
| *G06V 30/19* | (2022.01) |
| *G06V 30/416* | (2022.01) |

(52) U.S. Cl.
CPC ............ *G06F 16/338* (2019.01); *G06F 16/31* (2019.01); *G06V 10/82* (2022.01); *G06V 30/19147* (2022.01); *G06V 30/416* (2022.01)

(58) Field of Classification Search
CPC ....... G06F 16/338; G06F 16/31; G06V 10/82; G06V 30/19147; G06V 30/416
USPC .......................................................... 707/722
See application file for complete search history.

(56) References Cited

U.S. PATENT DOCUMENTS

| | | | |
|---|---|---|---|
| 12,008,332 B1 * | 6/2024 | Gardner | G06F 16/345 |
| 2020/0074515 A1 * | 3/2020 | Ghatage | G06F 40/58 |
| 2021/0117670 A1 * | 4/2021 | Manchanda | G06F 40/226 |
| 2022/0237368 A1 * | 7/2022 | Tran | G06N 20/00 |
| 2024/0184974 A1 * | 6/2024 | Burris | G06F 16/35 |

FOREIGN PATENT DOCUMENTS

WO        2011035389        3/2011

OTHER PUBLICATIONS

Cifuentes-Silva, et al., "Legislative Document Content Extraction Based on Semantic Web Technologies", May 25, 2019, Advances in Databases and Information Systems, Springer International Publishing, Cham, vol. 11503 Chap.36, Nr.: 558, pp. 558-573, XP047514221, retrieved on May 25, 2019.
Adebayo, "Multimodal Legal Information Retrieval", Apr. 27, 2018, XP055741019, Retrieved from the Internet: <https://orbilu.uni.lu/bitstream/10993/36614/1/Adebayo-Kolawole-Lux-thesis.pdf> retrieved on Oct. 16, 2020.
Koniaris et al., "Towards Automatic Structuring and Semantic Indexing of Legal Documents", Informatics, ACM, 2 Penn Plaza, Suite 701 New York NY 10121-0701 USA, pp. 1-6, XP058316095.
European Search Report for EP 22152279, completed Jun. 3, 2022.

* cited by examiner

*Primary Examiner* — Michael Pham
(74) *Attorney, Agent, or Firm* — Vorys, Sater, Seymour and Pease LLP; Anthony P. Venturino; Maryellen Feehery Hank

(57) ABSTRACT

It is provided a procedure for managing and updating regulatory digital textual documents, wherein the documents each define a textual structure including at least one or more textual portions, one or more reference parameters defined by at least one article and/or one paragraph, and one or more metadata, and wherein the process comprises acquiring a plurality of different documents from at least one external database, extracting the textual portions, the reference parameters and the metadata from each of the textual structures, recognising each textual structure by means of a first logic implementing an artificial intelligence based on a machine learning approach of supervised or zero-shot type, performing a multimodal analysis of the textual structure, by means of the first logic, labelling each of the textual portions, the reference parameters and the metadata to validate the extraction phase, identify the reference parameters and/or the metadata by means of a second logic implementing an artificial intelligence to produce a digital representation compliant with the Akoma Ntoso specifications or other standard for encoding normative texts, to index the textual portions by associating to each textual portion a respective reference parameter and/or a respective metadata by producing a plurality of indexed texts, to record separately each indexed text in an internal database accessible by a user, to logically link each indexed text whose reference parameters and/or metadata are mutually correlated within the database.

10 Claims, 2 Drawing Sheets

COMPUTER-IMPLEMENTED METHOD AND SYSTEM FOR MANAGING AND UPDATING REGULATORY DIGITAL TEXTUAL DOCUMENTS

FIELD OF THE INVENTION

The present invention relates to a procedure or autonomous system for managing and updating regulatory digital textual documents of the type specified in the preamble to the first claim.

In particular, the present invention relates to a process, and related system, for managing and updating regulatory documents, e.g. as defined by the European Banking Authority (EBA) and the European Commission (EC), intended for the financial world and part of the solutions classified as Reg Tech.

BACKGROUND OF THE INVENTION

As is known, the financial sector is a world of great fluidity and variability. In detail, at least part of this variability is determined by the continuous changes in the reference regulations governing the same sector and the need to conform or adapt the structure of the company or institution to these regulations.

In order to undertake compliance operations, it is necessary to consult the sources of publication of new regulations and compare them with the regulations already applied in the institution. These operations are carried out by trained staff who essentially carry out operations of research of regulatory texts, analysis of regulatory texts, contextualisation of the same within the pre-existing regulatory framework and proposal of changes within the company or institution.

The known technique described therefore includes some important drawbacks.

In particular, conformation operations are very costly both in terms of time and money.

Indeed, it is no coincidence that, as Duff and Phelps state in "Global Regulatory Outlook 2019", the percentage of revenue investment spent by banking institutions was 4% in 2017 and is growing strongly. It is assumed, in this respect, that the percentage of investment for compliance with current regulations could even reach 10% in 2023.

These numbers underline the enormous, and by no means negligible, transaction costs involved in bringing the institution's regulatory framework into line with up-to-date international and national regulations.

SUMMARY OF THE INVENTION

In this situation, the technical task at the basis of the present invention is to devise a process and autonomous system for managing and updating regulatory digital textual documents capable of substantially obviating at least part of the aforementioned drawbacks.

In the context of the aforementioned technical task, it is an important aim of the invention to obtain a procedure and autonomous system for managing and updating regulatory digital textual documents which makes it possible to considerably reduce the time and economic costs arising from the adaptation of the company structure to changes in normative references.

Another important aim of the invention is to realise a process and autonomous system for managing and updating reliable, accurate, fast and accessible multi-user regulatory digital textual documents.

In conclusion, a further task of the invention is to realise a process, and a related system, which enables the reduction of operational risks arising from compliance activities, providing the possibility to facilitate the exploitation of new business opportunities, e.g. new products, with less time as well as to control the adaptation of current products to regulatory updates.

The technical task and the specified purposes are achieved by a process and autonomous system for managing and updating regulatory digital textual documents as claimed. Preferred technical solutions are highlighted in dependent claims.

BRIEF DESCRIPTION OF THE DRAWINGS

The features and advantages of the invention are hereinafter clarified by a detailed description of preferred embodiments of the invention, with reference to the accompanying drawings, in which:

the FIG. 1 shows a first functional diagram of a process and autonomous system for managing and updating regulatory digital textual documents according to the invention; and the FIG. 2 shows a second functional diagram of a process and autonomous system for managing and updating regulatory digital textual documents according to the invention in which normative area tagger and statistics calculator functions are added.

DETAILED DESCRIPTION OF EMBODIMENTS

Figure 1:
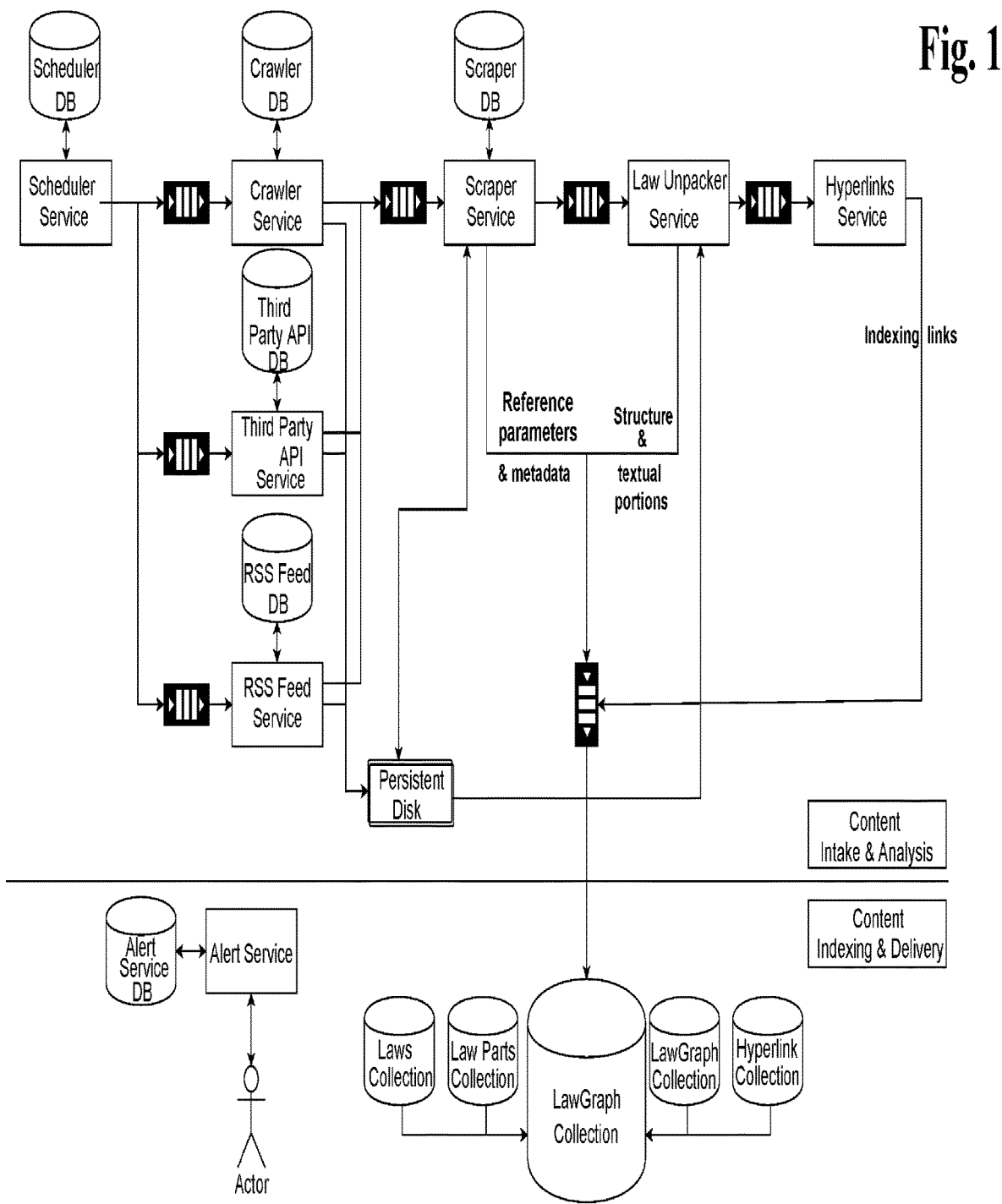

In the present document, the measurements, values, shapes and geometric references (such as perpendicularity and parallelism), when associated with words like "about" or other similar terms such as "approximately" or "substantially", are to be considered as except for measurement errors or inaccuracies due to production and/or manufacturing errors, and, above all, except for a slight divergence from the value, measurements, shape, or geometric reference with which it is associated. For instance, these terms, if associated with a value, preferably indicate a divergence of not more than 10% of the value.

Moreover, when used, terms such as "first", "second", "higher", "lower", "main" and "secondary" do not necessarily identify an order, a priority of relationship or a relative position, but can simply be used to clearly distinguish between their different components.

Unless otherwise specified, as results in the following discussions, terms such as "treatment", "computing", "determination", "calculation", or similar, refer to the action and/or processes of a computer or similar electronic calculation device that manipulates and/or transforms data represented as physical, such as electronic quantities of registers of a computer system and/or memories in, other data similarly represented as physical quantities within computer systems, registers or other storage, transmission or information displaying devices.

The measurements and data reported in this text are to be considered, unless otherwise indicated, as performed in the International Standard Atmosphere ICAO (ISO 2533:1975).

The management and updating process is configured to process regulatory digital textual documents.

Such documents may be digitised normative texts, e.g. present on the web, i.e. within the internet environment. In particular, regulatory digital textual documents may include regulations from e.g. the European Official Journal, EU Case Law, EU Opinions, the Italian Official Journal, the European Banking Authority (EBA) and the European Commission (EC), intended for the financial world and part of solutions classified as Reg Tech.

Each document defines a textual structure including at least one or more textual portions, one or more reference parameters and one or more metadata.

Textual portions are nothing more than the excerpts of text that define the standard or part of it. Usually, a single textual portion corresponds to a single norm, but different ways of discretisation can be implemented.

The reference parameters are the elements that make it possible to identify and contextualise the textual portion. Thus, for example, they can be defined at least by an article and/or a paragraph. The titles referring to the textual portion can also be included among the reference parameters.

The metadata are preferably references to other textual portions, possibly even parts of the textual portion. Therefore, metadata may include secondary referencing parameters that refer to other standards and that, in essence, refer back to the standard whose textual portion includes beforementioned metadata.

The procedure may include an acquisition phase.

In the acquisition phase, a plurality of different documents is acquired from an external database. The external database, as already partly anticipated, may include documents available on an Internet network. Therefore, the external database may be included in one or more servers, possibly even in a Cloud environment, accessible via the Internet. Or, more trivially, the external database may be included within a local physical storage medium.

The procedure may include an extraction phase. In the extraction phase, substantially the text portions, the reference parameters and the metadata are extracted from each of the text structures. Furthermore, in this phase, preferably the textual portions, the reference parameters and the metadata are mapped according to standards for encoding regulatory data such as Akoma Ntoso or others.

This phase is essentially preparatory to the subsequent phases of analysis and prepares each textual structure.

In particular, an application example of an extraction model may be that in the extraction phase documents are represented in the form of a sequence of images, i.e. pages. For each page, a classifier based on convolutional neural networks is used to identify the relevant portions of text and their sequentiality. The classifier also recognises non-relevant portions of text to be discarded, such as headers, footers, indexes, page numbers, etc., and footnotes that can later be treated separately, and can therefore be placed at the end of the document.

Advantageously, the procedure may include a recognition phase.

In the recognition phase, each textual structure is recognised through a first logic implementing an artificial intelligence based on a supervised or zero-shot machine learning approach.

The artificial intelligence based on zero-shot automatic learning, or zero-shot learning, can be substantially configured to learn to recognize new concepts having at its disposal a simple description of them. From this it follows that the model of artificial intelligence of this kind can be able to foresee parameters of reference and/or metadata never used in the normal training phases, essentially allowing the same intelligence to recognize also new textual structures which could arise in the future.

In particular, an applicative example of a recognition model may foresee that, once a sequence of text portions with their associated textual content has been obtained, a graphic realisation is transposed, e.g. an image frame containing the text portions, and some typographic characteristics such as font, font size, font weight or other. The procedure may include an enforcement phase.

In the execution phase, a multimodal analysis of the text structure is carried out by means of the first logic.

In detail, this phase is carried out by labelling each of the textual portions, the reference parameters and the metadata to validate the extraction phase. Basically, the execution phase corresponds to a verification phase of what was extracted in the extraction phase, which advantageously increases the accuracy of the procedure in its entirety.

More in detail, in the execution phase, the artificial intelligence can approach the task as a semantic segmentation task, which recognises the textual structure of the document by treating it as an image and performing the page segmentation by considering the text feature to enable the multimodal analysis determined by text and image analysis.

Furthermore, in order to improve the performance of the artificial intelligence, in the execution phase it can be envisaged to analyse the text and perform sentence level tagging on the text, for instance considering text and html, to validate the information extracted in the previous step and increase, as already mentioned, the accuracy of the procedure.

The procedure may include an identification phase.

In the identification phase, the reference parameters and/or metadata are essentially identified or recognised by a second logic implementing an artificial intelligence.

The second logic can implement an artificial intelligence classifier model, the model can be based on a neural network with long-term bidirectional memory (Bi-LSTM) enabled with a conditional causal field model or an artificial intelligence model including a Transformer neural network.

The second logic can be configured to produce a digital representation that conforms to a predefined representational scheme such as that of the Akoma Ntoso specification or another standard for encoding normative texts.

As is well known, the Akoma Ntoso standard and other standards for encoding normative texts and other representative schemes are defined so that regulatory references are represented using International Resource Identifiers (IRIs) to provide a way of referring to a universally shared resource that is invariant with respect to time, computer systems or software versions. Usually, these representational schemes distinguish two different IRIs: Documentary IRI used for document identification; non-documentary IRI used for identifying part of the or portion of text of said standard. Advantageously, the use of the Akoma Ntoso standard, or another standard for encoding normative texts, allows normative references to be disambiguated according to the versions of the documents under analysis.

The identification phase also preferably includes a detection sub-phase and a segmentation sub-phase.

In the detection sub-phase it is detected the presence of a said reference parameter and/or a said metadata in each of said textual portions through a classifier model, the model can be a neural network with at least one between long-term bidirectional memory (Bi-LSTM), recurrent neural networks, Transformer or based on manual engineering of the features, In the segmentation sub-phase it is segmented each of said reference parameters and said metadata through a sequential labelling activity carried out by at least one between;

a classifier of word-level sequences, that can be based on recurrent neural networks or on Transformer, or on manual engineering of the features accompanied by an output normalization tool;

a classifier based on recurrent neural networks, on Transformer or on manual engineering of the features; and an IRI pattern generator based on recurrent neural networks or Transformer.

These sub-phases are preferably implemented by means of a well-defined second logic. In detail, advantageously, the second logic implements an artificial intelligence model based on recurrent neural networks, also bidirectional, or on Transformer, or on manual engineering of features.

Thus, the detection sub-phase preferably involves detecting the presence of a reference parameter and/or metadata in each of the textual portions by means of a word-level sequence classifier based on appropriately bidirectional recurrent neural networks, Transformer, or manual engineering of the features.

The segmentation sub-phase preferably involves segmenting each of the benchmarks and metadata through a sequential labelling activity performed by one of a classifier based on appropriately bi-directional recurrent neural networks, Transformer, manual engineering of the features.

Basically, therefore, in the identification phase the sequence of texts recognised as images is preferably transformed into a tree structure. This tree structure can basically represent the structure of the document, divided into chapters, sections, articles or other.

More in detail, the transformation into a tree structure occurs at least thanks to a first classifier, implemented in the detection sub-phase, which decides when a part of the text starts as a new chapter, a new section, a new article, and a second classifier, implemented in the fragmentation sub-phase, which decides when a part of the text is considered closed and, therefore, ends a chapter, a section or other.

For example, the first classifier may be based on a Random Forest or Supported Vector Machine classification algorithm, and is preferably configured to take as entry, or input, manually engineered features such as the presence of certain formulas or patterns expressed via regular expression, stylographic information (length of parts of text, lexical richness, or other) and typographic features. Even alternatively, the first classifier may be based on a hand-defined grammar or on machine learning techniques and is preferably configured to take as entry, or input, manually engineered features such as the typical structure of legal documents, the sequence of opening tags as predicted by the first classifier and typographical features.

The process includes, in addition, an indexing phase.

In the indexing phase, preferably, the textual portions are indexed. In particular, they are indexed by associating to each textual portion a respective reference parameter and/or a respective metadata by creating a plurality of indexed texts.

The texts indexed in this way are useful texts that can be organised in a management system.

The procedure may preferably also include a registration phase.

In the registration phase, each indexed text is registered in an internal database accessible by at least one user.

The internal database can, of course, be included in an internet environment, e.g. within a cloud system, and can be included in one or more servers.

Or, the internal database can be recorded on a local physical medium.

The procedure may include a liaison phase.

In the linking phase, preferably, each of the indexed texts is logically linked in relation to specific characteristics.

In detail, indexed texts whose reference parameters and/or metadata are mutually correlated are advantageous. The correlation can be one of coincidence, or of dependency, between indexed texts. For example, an article or a paragraph referred to in one indexed text may be referred to in another indexed text and, for this reason, these indexed texts may be linked to each other. In particular, thanks to the use of the Akoma Ntoso standard, or another standard for encoding normative texts, normative links between the various versions of documents can be disambiguated on the basis of certain metadata such as date of publication, date of entry into force or other.

The indexed texts are, therefore, linked together, according to the described logic, within the database in such a way that, when the user consults an indexed text, the same user can directly access each other indexed text related to it.

The process may include additional advantageous features.

In fact, the process may include a representation phase.

In the representation phase, the indexed texts are represented in the internal database in a digital document that can be consulted by the user.

Such document may be a simple list of standards and titles accessed via hypertext links. Or, advantageously, the digital document may include hyperlinks organised in a graph structure.

The graph structure, therefore, includes vertices corresponding to each of the indexed texts and connecting lines between the related indexed texts.

Such a representation has the advantage of allowing the user to get an overview of the current legislation, while at the same time making it possible to adequately and efficiently go into all aspects of individual regulations and the regulations, or parts of regulations, linked to them.

In addition, the procedure may include a monitoring phase.

In the monitoring phase, the external database is monitored with a predetermined time frequency. This means that the process may involve performing certain actions at a frequency of, for example, daily or weekly or monthly or whatever.

Preferably, monitoring is configured to check whether scanned documents have been modified and/or additional documents have been added.

Thus, in the monitoring phase, the autonomous system can be configured to carry out a further capture phase if documents have been modified and/or additional documents have been added.

Thus, the process may comprise a forwarding phase. In the forwarding phase, the system preferably forwards a warning signal to the user each time the further acquisition phase is carried out.

This means that the process according to the invention allows the user to be warned of any updates related to the regulations.

The invention also introduces a new autonomous system for managing and updating regulatory digital textual documents.

The system substantially comprising means for implementing the process according to the invention as described above.

An initial example of the architecture of such a system is shown in FIG. 1.

The implementation example essentially describes a system including a set of content intake & analysis microservices responsible for collecting incoming regulations from available and supported European regulatory sources and their analysis through artificial intelligence logic analysis, of microservices responsible for the collection of incoming regulations from available and supported European regulatory sources as well as their analysis through artificial intelligence logics.

The content intake set has a scheduler service, or scheduler service, which is fully configurable to start periodically according to the update frequency of each specific normative source and also supports RSS feed resources with an RSS feed service, or RSS feed service. The crawler service, or crawler service, and the scraper service, or scraper service, are responsible for extracting the reference parameters, metadata and textual portions from the collected regulations, which are then analysed by first logic, determined by AI LawUnpacker, and second logic, determined by AI ReferenceExtractor, just before the indexing and registration phase. The Law Reference Service also implements hyperlink matching logic, which consists of recognising the correct legislation referred to in a specific regulation, e.g. correct legislation, correct and valid version in force or other, just before storing this link or link in the internal database so that the end user can browse the legislation interactively.

The content indexing and distribution set, or content indexing & delivery, is responsible for indexing the results of textual structure extraction and normative references carried out by artificial intelligence logic. The content indexing and delivery set is equipped with instances of the internal database and the associated index. The content indexing and distribution set is equipped with the instances of the internal database and the associated index, which make up the registration system that allows the end user to efficiently access the archived standards, i.e. the indexed texts, as well as allowing the scalability of the entire system according to the workload. To complete the distribution of content, or content delivery, the alert service is implemented to ensure that the end user can customise their preferred alerts, e.g. receive an email every time there is a new regulatory update, for example for one or more regulations of interest, or for a specific portion of the regulations available in the system.

Figure 2:
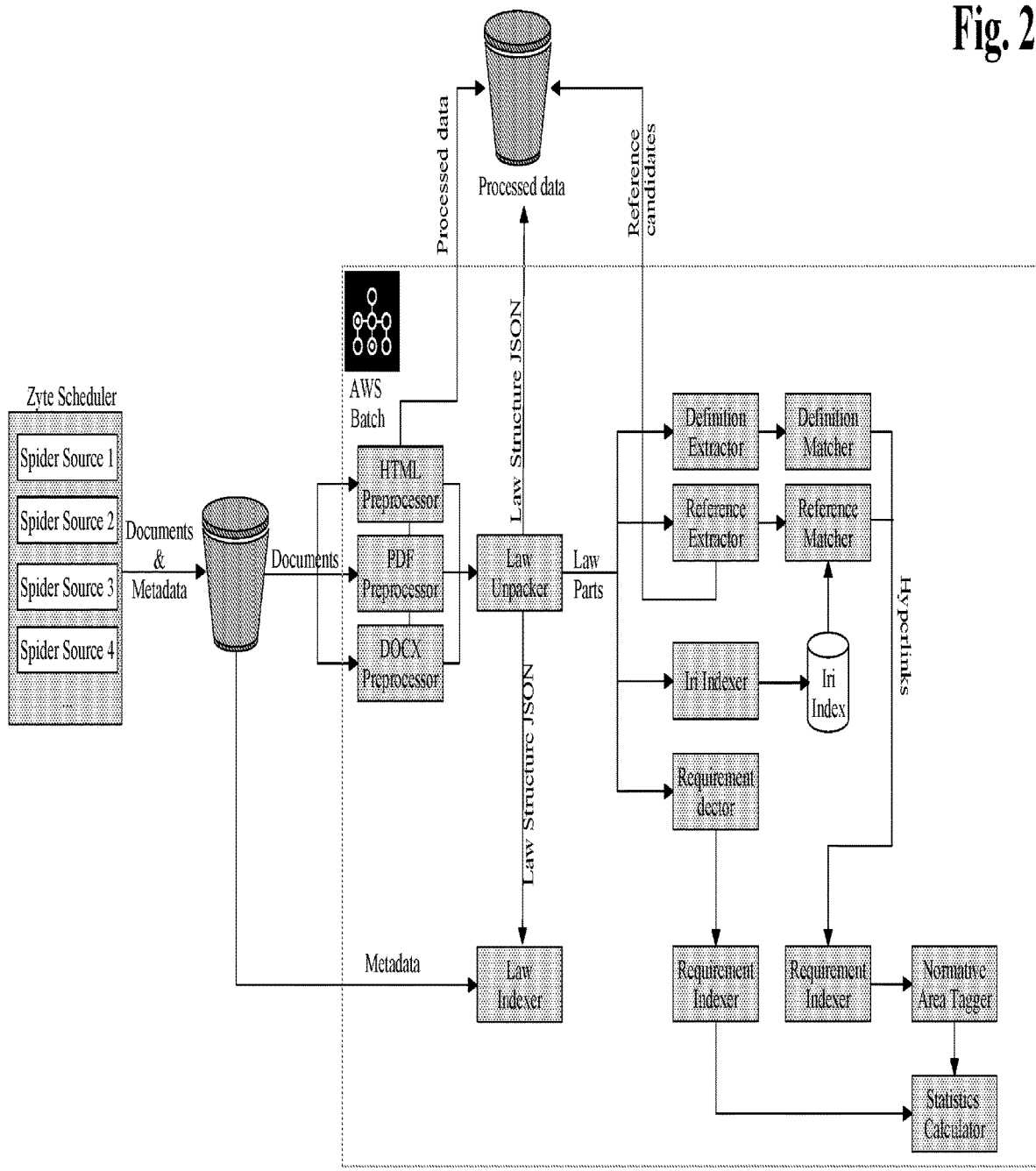

A second example of the implementation architecture of such a system is shown in FIG. 2.

In this example, some functionalities are substantially added to the procedure. The latter, following the indexing phase, can further provide for a labelling of the normative area, or normative area tagging, and a statistical calculation based on one or more parameters of the sequences of normative texts, or statistics calculator. The invention may comprise a computer program comprising instructions which, when the program is executed by the computer, enable the computer to perform the process according to the invention.

Naturally, such a programme is preferably part of the system described above.

In conclusion, the invention may comprise a computer readable storage medium comprising instructions which, when executed by the computer, enable the computer to perform the process according to the invention.

The storage medium may include, for example, the internal database.

The process, and associated autonomous system, of managing and updating regulatory digital textual documents according to the invention achieves important advantages.

In fact, the procedure and its system make it possible to considerably reduce the time and economic costs involved in adapting the company's structure to changes in regulatory references.

The process and said system are very reliable, accurate, fast and provide accessible consultation tools for multiple users.

The procedure and system also make it possible to obtain a set of linked regulatory texts which, taken together, define a complete machine readable regulation. In conclusion, the process and its system reduce the operational risks arising from compliance activities, providing the possibility to facilitate the exploitation of new business opportunities, e.g. new products, with less time as well as controlling the adaptation of current products to regulatory updates.

The invention is susceptible to variations within the scope of the inventive concept defined by the claims. Within this scope, all details are substitutable by equivalent elements and the materials, shapes and dimensions can be any.

The invention claimed is:

1. A computer-implemented method for a procedure for managing and updating regulatory digital textual documents,
   said digital textual documents each defining a textual structure including at least one or more textual portions, one or more reference parameters defined by at least one article and/or a paragraph, and one or more metadata,
   said procedure comprising the following steps implemented on a computer:
   (a) acquiring a plurality of different said documents from at least one external database,
   (b) extracting said textual portions, said reference parameters and said metadata from each of said textual structures,
   (c) recognizing each said textual structure through a first logic implementing an artificial intelligence based on a supervised or zero-shot type learning approach,
   (d) performing a multimodal analysis of said textual structure, through said first logic, labeling each of said textual portions, said reference parameters and said metadata to validate said extracting,
   (e) identifying said reference parameters and/or said metadata through a second logic implementing an artificial intelligence to produce a digital representation conforming to Akoma Ntoso specifications or other standard for encoding normative texts,
   (f) indexing said textual portions by associating each said textual portion with a respective said reference parameter and/or a respective said metadata realizing a plurality of indexed texts,
   (g) separately recording each said indexed text in an internal database accessible by at least one user, and
   (h) logically connecting each said indexed text whose said reference parameters and/or metadata are mutually correlated within said internal database in such a way that, when a user consults said indexed text, said user can directly access each other said indexed text correlated to said indexed text,
   wherein said second logic is further configured to implement an artificial intelligence model based on a neural network with long short-term bidirectional memory (Bi-LSTM) enabled with a conditional causal field model or an artificial intelligence model including a Transformer neural network, and said identifying (e) includes sub-phases of:

(i) detecting the presence of a reference parameter or metadata in each of said textual portions through at least one of a neural network having long short-term bidirectional memory (Bi-LSTM), a recurrent neural network, or a transformer neural network, and (ii) segmenting each reference parameter and metadata present through a sequential labelling step carried out by at least one of:

a classifier of word-level sequences based on a recurrent neural network or a transformer neural network; or an inter-neuronal rhythmicity (IRI) pattern generator based on a recurrent neural network or a transformer neural network.

2. The method according to claim 1,
wherein the segmenting includes manually engineering features and output normalization.

3. The method according to claim 1, comprising representing said indexed texts in said internal database within a digital document that can be consulted by said user.

4. The method according to claim 3, wherein said digital document includes hyperlinks organized in a graph structure including vertices corresponding to each of said indexed texts and connecting lines between said indexed related texts.

5. The method according to claim 1, comprising monitoring said external database with a predetermined time frequency so as to verify if said acquired documents have been modified and/or have been added further said documents and to carry out a further acquisition phase if said documents have been modified and/or have been added.

6. The method according to claim 5, comprising forwarding a warning signal to said user each time said further acquisition phase is performed.

7. The method according to claim 1, wherein said external database includes said documents available on an internet network.

8. The method according to claim 2, comprising representing said indexed texts in said internal database within a digital document that can be consulted by said user, wherein said digital document includes hyperlinks organized in a graph structure including vertices corresponding to each of said indexed texts and connecting lines between said indexed related texts, comprising monitoring said external database with a predetermined time frequency so as to verify if said acquired documents have been modified and/or have been added and to carry out a further acquisition phase if said documents have been modified and/or have been added.

9. A system comprising a computer with a computer program having instructions that, when the computer program is executed by said computer, cause the computer to perform a procedure for managing and updating regulatory digital textual documents, said digital textual documents each defining a textual structure including at least one or more textual portions, one or more reference parameters defined by at least one article and/or a paragraph, and one or more metadata, wherein said procedure performed by the computer includes the following operations:

acquiring a plurality of different said documents from at least one external database, extracting said textual portions, said reference parameters and said metadata from each of said textual structures, recognizing each said textual structure through a first logic implementing an artificial intelligence based on a supervised or zero-shot type learning approach, performing a multimodal analysis of said textual structure, by means of said first logic, labeling each of said textual portions, said reference parameters and said metadata to validate said extracting, identifying said reference parameters and/or said metadata through a second logic implementing an artificial intelligence to produce a digital representation conforming to Akoma Ntoso specifications or other standard for encoding normative texts, indexing said textual portions by associating each said textual portion with a respective said reference parameter and/or a respective said metadata realizing a plurality of indexed texts, separately recording each said indexed text in an internal database accessible by at least one user, and logically connecting each said indexed text whose said reference parameters and/or metadata are mutually correlated within said internal database in such a way that, when a user consults said indexed text, said user can directly access each other said indexed text correlated to said indexed text, wherein said second logic is further configured to implement an artificial intelligence model based on a neural network with long short-term bidirectional memory (Bi-LSTM) enabled with a conditional causal field model or an artificial intelligence model including a Transformer neural network, and said identifying includes sub-phases of:

detecting the presence of a reference parameter or metadata in each of said textual portions through at least one of a neural network having long short-term bidirectional memory (Bi-LSTM), a recurrent neural network, or a transformer neural network, segmenting each reference parameter and metadata present through a sequential labelling operation carried out by at least one of:

a classifier of word-level sequences based on a recurrent neural network or a transformer neural network; or an inter-neuronal rhythmicity (IRI) pattern generator based on a recurrent neural network or a transformer neural network.

10. A non-transitory computer readable storage medium comprising instructions that, when executed by a computer, enable said computer to perform procedure for managing and updating regulatory digital textual documents, said digital textual documents each defining a textual structure including at least one or more textual portions, one or more reference parameters defined by at least one article and/or a paragraph, and one or more metadata, wherein said procedure performed by the computer includes the following operations:

acquiring a plurality of different said documents from at least one external database, extracting said textual portions, said reference parameters and said metadata from each of said textual structures, recognizing each said textual structure through a first logic implementing an artificial intelligence based on a supervised or zero-shot type learning approach, performing a multimodal analysis of said textual structure, by means of said first logic, labeling each of said textual portions, said reference parameters and said metadata to validate said extracting, identifying said reference parameters and/or said metadata through a second logic implementing an artificial intelligence to produce a digital representation conforming to Akoma Ntoso specifications or other standard for encoding normative texts, indexing said textual portions by associating each said textual portion with a respective said reference parameter and/or a respective said metadata realizing a plurality of indexed texts, separately recording each said indexed text in an internal database accessible by at least one user, and logically connecting each said indexed text whose said reference parameters and/or metadata are mutually correlated within said internal database in such a way that, when a user consults said indexed text, said user can directly access each other said indexed text correlated to said indexed text, wherein said second logic is further configured to implement an artificial intelligence model based on a neural network with long short-term bidirectional memory (Bi-LSTM) enabled with a conditional causal field model or an artificial intelligence model including a Transformer neural network, and said identifying includes sub-phases of:

detecting the presence of a reference parameter or metadata in each of said textual portions through at least one of a neural network having long short-term bidirectional memory (Bi-LSTM), a recurrent neural network, or a transformer neural network, segmenting each reference parameter and metadata present through a sequential labelling operation carried out by at least one of:

a classifier of word-level sequences based on a recurrent neural network or a transformer neural network; or an inter-neuronal rhythmicity (IRI) pattern generator based on a recurrent neural network or a transformer neural network.

* * * * *